(12) United States Patent
Sanamrad

(10) Patent No.: US 6,813,630 B1
(45) Date of Patent: Nov. 2, 2004

(54) SYSTEM AND METHOD FOR COMMUNICATING INFORMATION CONTENT BETWEEN A CLIENT AND A HOST

(75) Inventor: Mohammad Ali Sanamrad, Lidingö (SE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/510,182

(22) Filed: Feb. 22, 2000

(30) Foreign Application Priority Data

Jul. 8, 1999 (GB) .............................. 9918615

(51) Int. Cl.$^7$ .............................................. G06F 15/16
(52) U.S. Cl. ...................... 709/203; 709/217; 709/219; 345/156
(58) Field of Search ......................... 709/203, 217–219, 709/200; 345/158, 168–169, 156

(56) References Cited

U.S. PATENT DOCUMENTS

| | | | |
|---|---|---|---|
| 5,247,285 A | * 9/1993 | Yokota et al. | 345/169 |
| 5,793,359 A | 8/1998 | Ushikubo | 345/169 |
| 5,952,996 A | * 9/1999 | Kim et al. | 345/158 |
| 5,986,644 A | * 11/1999 | Herder et al. | 345/158 |
| 6,052,116 A | * 4/2000 | Takagi | 345/169 |
| 6,072,468 A | * 6/2000 | Hocker et al. | 345/157 |
| 6,137,476 A | * 10/2000 | Hocker et al. | 345/163 |
| 6,275,214 B1 | * 8/2001 | Hansen | 345/158 |
| 6,304,250 B1 | * 10/2001 | Yang et al. | 345/168 |

FOREIGN PATENT DOCUMENTS

| | | | |
|---|---|---|---|
| EP | 0869451 | 10/1998 | G06K/11/08 |
| EP | 0940764 | 9/1999 | G06K/11/18 |
| GB | 2283589 | 10/1995 | G06F/9/46 |
| JP | 11-053095 | 2/1999 | G06F/3/03 |
| JP | 11-095931 | 4/1999 | G06F/3/033 |
| JP | 11-212632 | 8/1999 | |
| WO | 0993157 | 6/1999 | G06F/3/033 |

* cited by examiner

Primary Examiner—Patrice Winder
Assistant Examiner—Philip B. Tran
(74) Attorney, Agent, or Firm—A. Bruce Clay; Yee & Associates, P.C.

(57) ABSTRACT

Disclosed are a system, apparatus, method and computer program for communicating information content using wireless means between a host and a client in a communications system, wherein the client is adapted to transmit pointer movement signals and selection signals to a host. The host is adapted to receive pointer movement signals and selection signals and to display a pointer and a selection boundary, and is further adapted to transmit data to the client. The client is adapted to receive and store in storage the data thus acquired. Preferably the client is further adapted to transmit to a host pointer movement and insertion point selection signals and to transmit selected data from its storage to the host. The host is adapted to receive these signals and data, and to respond by displaying the data according to the insertion point selection signal.

12 Claims, 3 Drawing Sheets

SYSTEM AND METHOD FOR COMMUNICATING INFORMATION CONTENT BETWEEN A CLIENT AND A HOST

FIELD OF THE INVENTION

This invention relates to the field of communicating computing systems in which a client and a host communicate with one another.

BACKGROUND OF THE INVENTION

In the field of data processing, graphical user interfaces have become standard, contributing greatly to the ease of use of computing systems. As computational functions become embodied in other devices, even down to the domestic appliance level, such interfaces will be ubiquitous. In particular, at present, most personal computers employ a graphical windowing environment and a desktop or other real-world metaphor for manipulating objects at the user interface. One function that is commonly implemented in such a graphical user interface is the capability of copying or cutting and pasting objects from one application into another. The word object is here used for convenience to mean any type of data-containing object, including text, graphics, sound or any hypermedia.

The possibility of "copy and paste" was a revolutionary step in improving efficiency for all computer users. Using a mouse to point to and select information on a screen, one can easily mark objects to be copied to a clipboard in the computer's storage and subsequently pasted into a different session running on the same computer. It is also possible to send the contents of the clipboard storage from one computer in a network to another, and thus indirectly copy and paste from a session in one computer to another.

In both cases, the material to be copied is passed from the user's application session to a system-owned clipboard storage area within the computer's storage. In the first case, it is then retrieved by another application session in the same computer. In the second case, the contents of clipboard storage in a first computer are transferred as a data stream into the clipboard storage of a second computer in the network; from that clipboard storage, an application session in the second computer can retrieve the material using a normal "paste" action.

SUMMARY OF THE INVENTION

In a first aspect, the present invention provides a communications system comprising: client apparatus comprising a pointer, a control program in communication with first wireless apparatus adapted to transmit pointer movement and selection signals, and first means responsive to said selection signal for communicating information content between said client apparatus and a host apparatus; and host apparatus comprising a display, a control program in communication with second wireless apparatus adapted to receive said pointer movement and selection signals from said client apparatus, means responsive to said signals for locating and selecting one or more positions on said display, and second means responsive to said selection signal for communicating information content between said client apparatus and said host apparatus.

The communications system of the first aspect is preferably further characterised in that said area of content comprises one or more objects.

The communications system of the first aspect is preferably further characterised in that said selection signals comprise area selection signals to select an area of content on said display, whereby said area of content is selected for communication from said host to said client.

Preferably, the communications system is further characterised in that said selection signals comprise insertion point selection signals to select an insertion point on said display, whereby said insertion point is used to mark a location for insertion of content communicated from said client to said host.

Also, a communications system as described is preferably further characterised in that said pointer movement and selection signals are generated responsive to movements of a pointer device, or to keyboard keystrokes, or to actions carried out on a touchscreen.

It is preferred that a communications system as described is further characterised in that said wireless apparatus comprises IrDA apparatus.

In a second aspect, the present invention provides client apparatus comprising: a pointer; a control program in communication with a wireless apparatus adapted to transmit pointer movement and selection signals; and means responsive to said selection signal for communicating information content between said client apparatus and a host apparatus.

In a third aspect, the present invention provides host apparatus comprising: a display; a control program in communication with a wireless apparatus adapted to receive pointer movement and selection signals from a client apparatus; means responsive to said signals for locating and selecting one or more positions on said display; and means responsive to said selection signal for communicating information content between a client apparatus and said host apparatus.

The apparatus of the second and third aspects is preferably further characterised in that said wireless apparatus is IrDA apparatus.

In a fourth aspect, the present invention provides a method for communicating information content using wireless apparatus in a communications system, the method comprising the steps of: transmitting, by a client, pointer movement and selection signals; receiving, by a host, said pointer movement and selection signals; responsive to said pointer movement signals and selection signals, locating and selecting one or more positions on a display at said host; and responsive to said selection signal, communicating information content between said client and said host.

In a fifth aspect, the present invention provides a computer program for a communications system comprising computer program steps for: causing a client to transmit by wireless means pointer movement and selection signals to a host; responsive to said pointer movement signals and said selection signals, causing said client and said host to locate and communicate by wireless means information content between said client and said host.

In a sixth aspect the present invention provides a computer program for a communications system comprising computer program steps for: causing a host to receive by wireless means pointer movement and selection signals from a client; responsive to said pointer movement signals and said selection signals, causing said client and said host to locate and communicate by wireless means information content between said client and said host.

The invention provides ways of transferring data preferably in clipboard format from a host computer to a physically separate client without the use of a predefined set of network connections or cabling, and without an active sending action on the part of a user of the host computer. There are, for example, many situations in which the invention can be used to acquire data from a host computer and store it in a physically separate, handheld device (a personal digital assistant, or PDA, for example) for later use, either within the PDA, or on some other target computer. For example, the invention can be used to store displayed information from a screen at a public library or at an exhibition for later retrieval, without having to set up and define the network connections between the host computer and a PDA.

BRIEF DESCRIPTION OF THE DRAWINGS

Embodiment; and of the present invention will now be described by way of example, with reference to the drawings in which.

DESCRIPTION OF THE PREFERRED EMBODIMENTS

Figure 1:
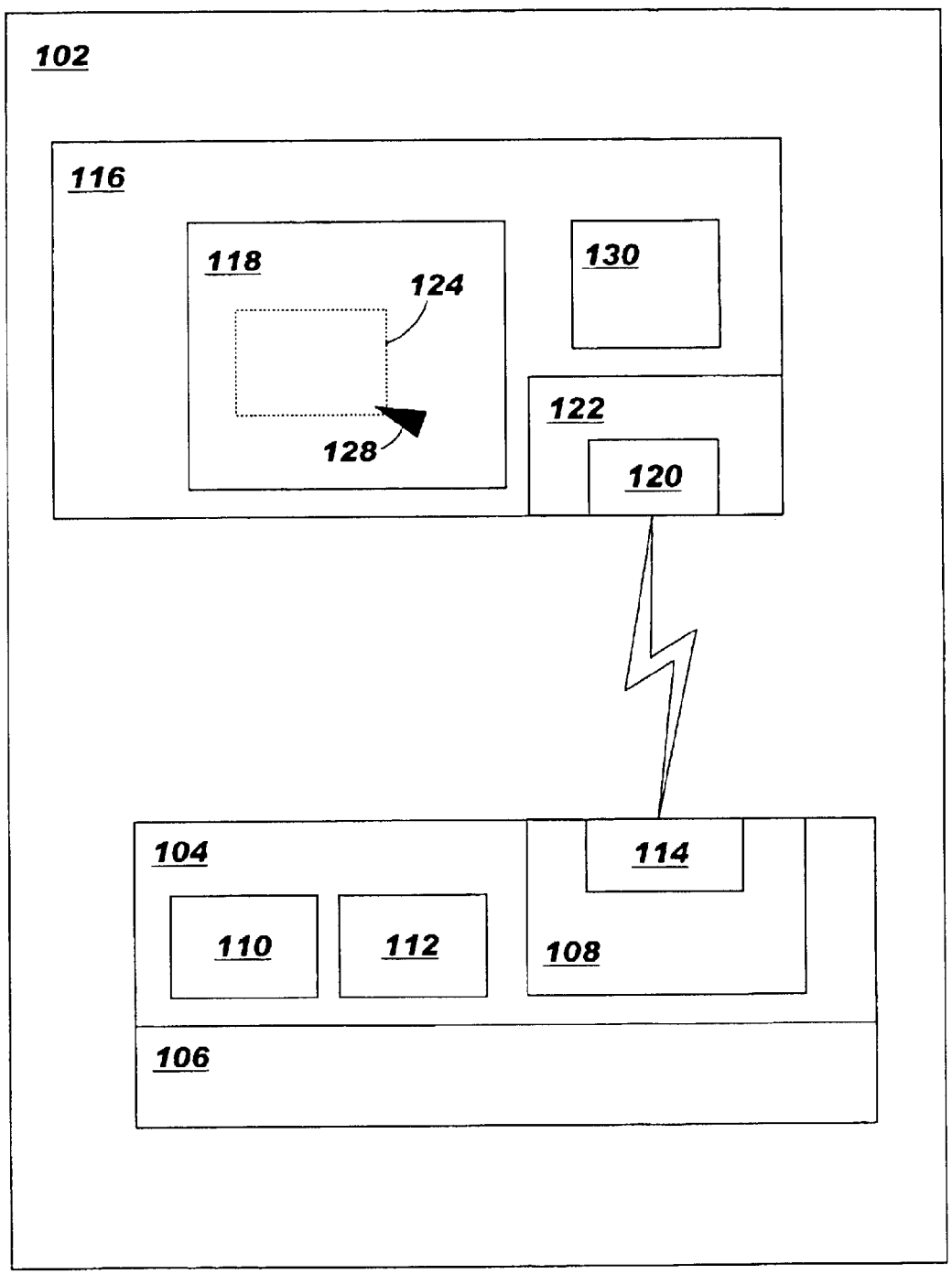
FIG. 1 shows a communicating client-host system according to a preferred embodiment.

In FIG. 1 there is shown a communications system (102) comprising a client apparatus (104), which could be a personal digital assistant (PDA) or the like (for example a Nokia 9000 Communicator), and a host apparatus (116). Client (104) and host (116) are adapted to communicate wirelessly by means of, for example, IrDA ports (114, 120). The use of infrared signals for communication between computing devices is well known in the art, and is the subject of several standards defined by the Infrared Data Association (IrDA). Communications between client (104) and host (116) are controlled by one of the known types of communications subsystems (108, 122), which may be embodied in hardware, such as application-specific integrated circuit (ASIC) chips, or may be software program elements within programmable apparatus. Host (116) has a display (118) for displaying information and a control program (130) for controlling the contents of the display. Control program (130) is used for controlling the display of text, graphics and such entities as mouse cursors and dragged selection boundaries, in response to control messages. (A dragged selection boundary is a boundary drawn round some content on a display screen, usually in response to a mouse movement with the left button held down.) Client (104) is provided with storage (106), a pointer control (110) and a control program (112) adapted to receive messages from the pointer control (110).

Client (104)) is adapted, by use of the combination of pointer control (110), control program (112), communications subsystem (108) and IrDA port (114) to create and transmit screen pointer movement and selection messages to host (116).

Figure 2:
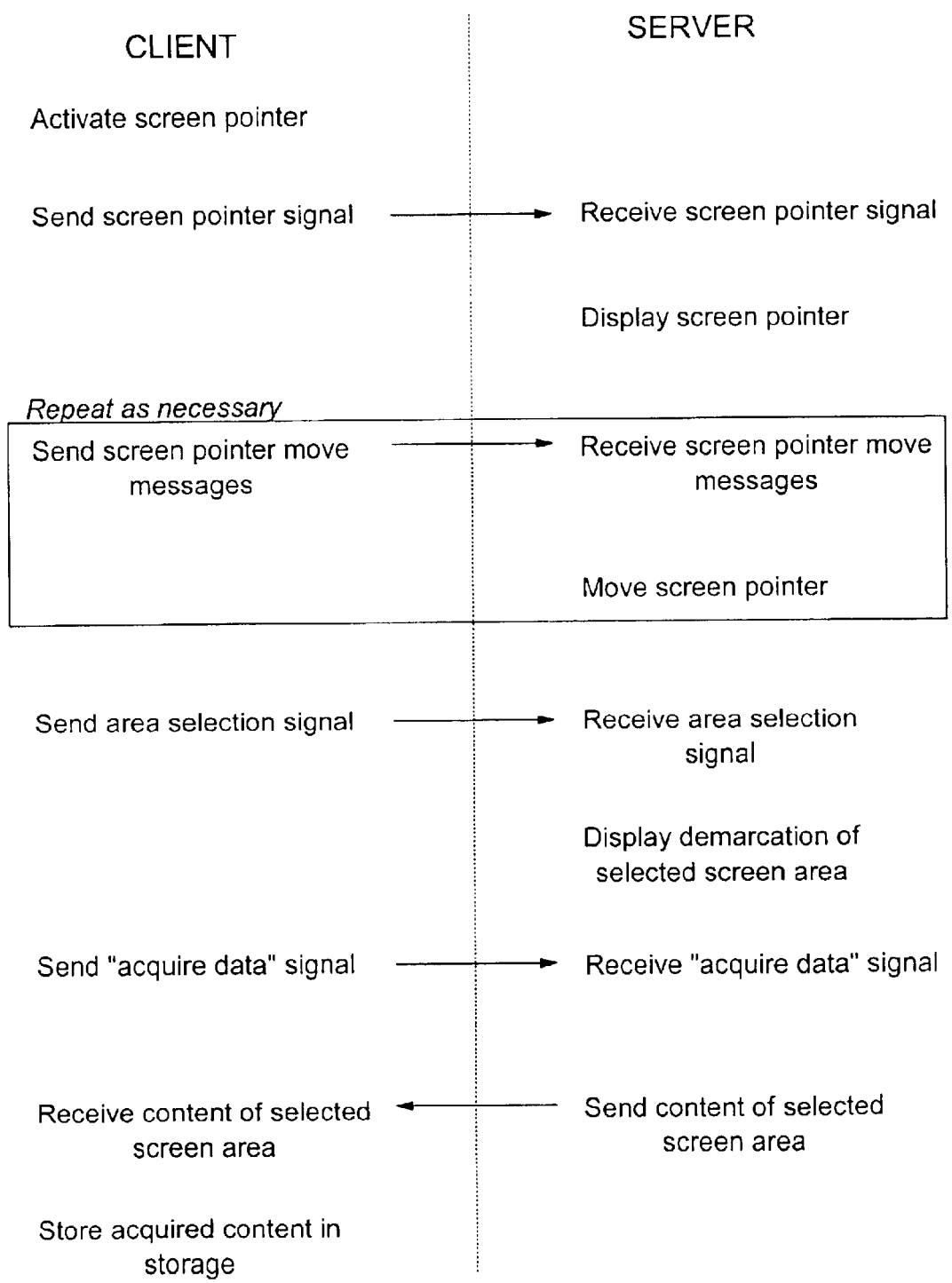
FIG. 2 is a process chart of a part of a processing method according to a preferred embodiment.
Figure 3:
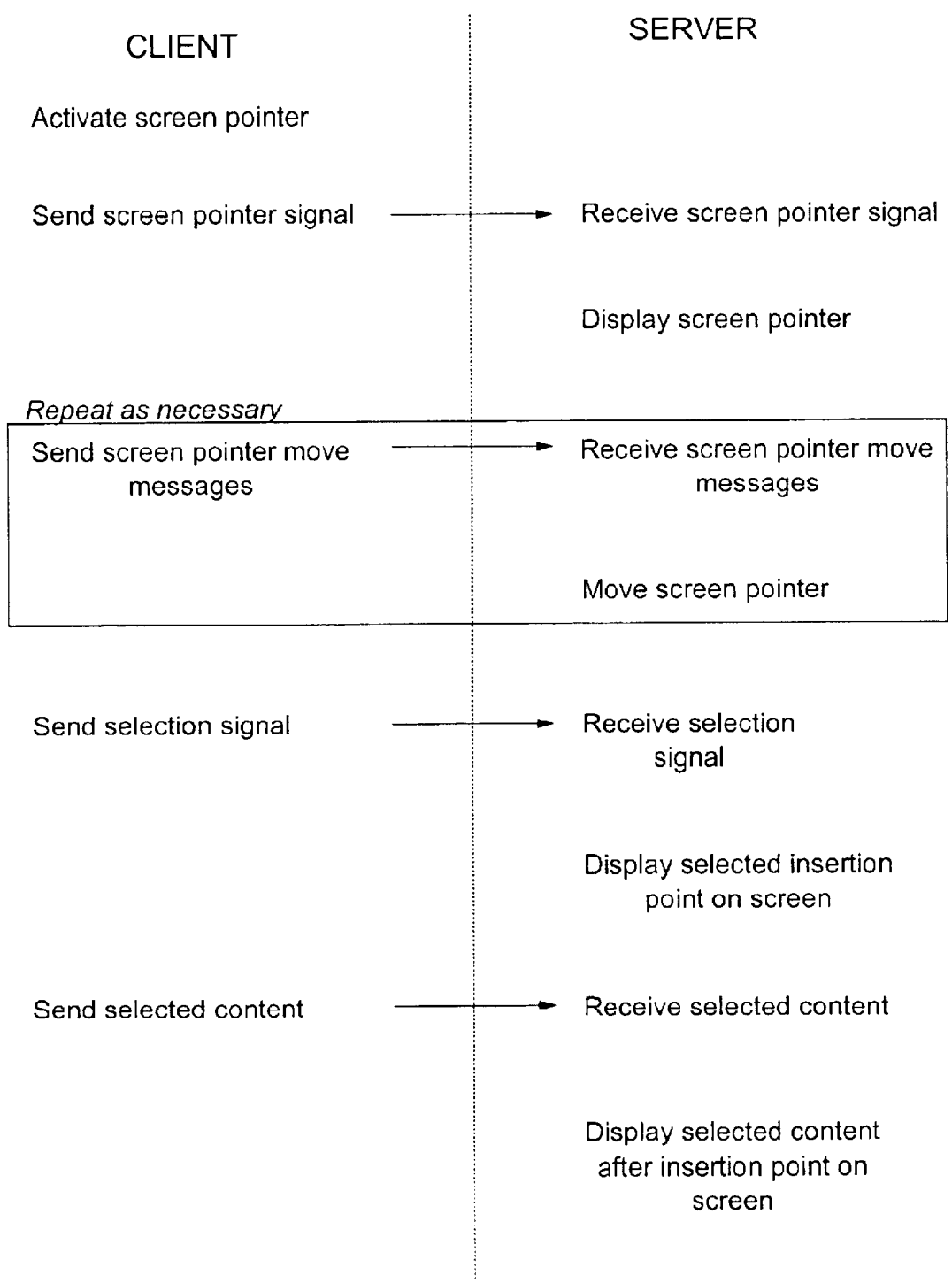
FIG. 3 is a process chart of a further part of a processing method according to a preferred embodiment.

In more detail, the operational sequence of a preferred embodiment will now be described with reference to FIGS. 1, 2 and 3. The user activates a control program (112) on the client. The control program offers the user the options of copying and pasting. The user selects, in the first instance, a copy option. The control program now has control of the pointer. The pointer control (110) communicates with the control program (112), which may be embodied as a utility program or an embedded subsystem within the client, and which provides for the control of a visible (or otherwise tangible) pointer by means of a set of control signals relating to pointer movement and selection. The control program (112) may intercept the communication of pointer movement and selection signals before they are passed to the normal device pointer functions of the client's operating system, or it may be run as a separate application, having assumed control of the pointer functions, on top of the operating system. In any case, the control program (112) provides functions to interpret pointer messages that identify the position (in x and y coordinates, or in any other suitable form) at which the pointer is to be displayed, and messages that identify "button" actions (the equivalent of mouse button-clicks and button-down actions).

The client (104) responds to the acquisition of control of the pointer by control program (112) by acquiring a communications link to host (116) which it does by activating the communication subsystem (108). Client (104) then transmits a screen pointer start message to host (116). Host (116) receives the message through IrDA port (120) and communications subsystem (122), and causes pointer (128) to be displayed. Client (104) uses the same communications mechanisms to transmit screen pointer movement messages to host (116), which responds by causing pointer (128) to move within the display (118). The user decides to copy data from display (118), so activates pointer control (110) by, for example, pressing a mouse button or the like, in response to which control program (112) uses the communications mechanisms described above to send selection signals from client (104) to host (116). Host (116) receives the selection signals and displays a boundary (124) around the selected screen area on display (118). In a preferred embodiment, the boundary is created by moving the client's pointer diagonally from one corner to the diagonally opposite corner of the area to be selected, while holding down a control button. Releasing the control button both completes the marking out of the boundary and sends an "acquire data" signal to the host; the host then initiates transmission of the content for the selected area to the client. To achieve this, in the preferred embodiment, the host converts the content of the bounded area into clipboard data format in the same way that it would convert data selected for a conventional copy operation. The content is then transmitted in clipboard format. Alternatively, any suitable data format may be used, depending on the operating system environments of the client and the host.

As can be seen from the above description, the host is thus made to act as if the client's pointer signals were local pointer signals from a mouse or the like attached to the host. The user's actions in the preferred embodiment are thus familiar to users who have carried out conventional copy-and-paste operations using a graphical user interface and a mouse pointer.

As an alternative to the combining of the boundary marking and the "acquire data" signal described above, the user may use any other method to activate a function on client (104) which sends an "acquire data" signal to the host (116). For example, a "Mark" key and a "Bound" key may be used to define the diagonally opposite corners of the area to be selected, and a "Transmit" key may then be used to send the "acquire data" signal.

In any case, in response to the "acquire data" signal, host (116) sends the content of the selected screen area to hi client (104), which stores the acquired content in its storage (106). If the client device is a PDA, the content or a portion of the content can be displayed and used on the screen of the PDA. It can also be transferred to another computer, for example, by the use of a data file transfer program and a connecting cable, as data is conventionally transferred between PDAs and personal computers.

Alternatively, a second embodiment can be used to transfer the information from the client to a host, as will now be described with reference to FIGS. 1 and 3. The user activates control program (112) which offers the copy and paste functions and intercepts pointer control signals as described above. Client (104) responds by acquiring a communications link to host (116) by activating the communication subsystem (108). Client (104) then transmits a screen pointer start message to host (116). Host (116) receives the message through IrDA port (120) and communications subsystem (122), and causes pointer (128) to be displayed. Client (104) uses the same communications mechanisms to transmit screen pointer movement messages to host (116), which responds by causing pointer (128) to move within the display (118). The user decides to copy data from storage (106) on client (104) to display (118) on host (116); the user uses a pointer button action (or the like) which is intercepted by control program (112), which causes transmission of an insertion point selection signal from client (104) to host (116). Host (116) receives the insertion point selection signal. This action may either automatically trigger the sending of content from storage (106), or alternatively, the user may select content from storage (106) and activate a function on client (104) to send the selected content to the host (116). In response to the receipt of the selected content, host (116) displays the selected content after the insertion point on display (118).

In addition to the preferred embodiment as described above, there are further refinements that can be implemented. One such refinement is that, to avoid confusion to users of systems having a primary cursor pointer, the screen pointer associated with the client should be visibly different from a conventional mouse-pointer cursor as found in conventional graphical user interfaces. Note that not all hosts will have such a primary cursor pointer, but in the case of a host having such a primary cursor pointer, it is preferable to distinguish the client's pointer from the host's primary cursor pointer. Also, for convenience in situations where multiple users are acquiring information from the same host, the screen pointers associated with each of a plurality of clients should be uniquely identifiable. This can be done by, for example, associating a text label with each pointer, giving each client device a unique pointer for this function, or possibly offering the user a choice of pointer shapes, colours or other characteristics. As a further example of the possible refinements, the pointer can be controlled by any of the available means of controlling pointers or cursors; by, for example, a Trackpoint or by using the touchscreen capability of a PDA to present cursor arrow buttons for manipulation by the user. Similarly, the touchscreen of a PDA may show a scaled-down representation of a host screen and allow the user to draw the area of desired content directly on the scaled-down representation using a finger, a stylus, or the like.

Additionally, for example, host (116) can be provided with the capability to enable or disable (lock) the copy function, and thereby prevent the contents of the display (118) from being acquired by a handheld device. This may be desirable for the security of data that the owner of host (116) does not want to be copied, and also as a means of preventing breach of copyright in material. It is possible to do this at a system-wide level, program-level, or even file-level. All of these can easily be done by extensions to conventional access and authorization controls in the host (116).

The client device (104) may also be extended to have a user identification which can then be checked to determine how the host (116) responds to the client device and to select who will have the authority to copy what. A further possible use of such an identifier is to serve as a means of charging a user for information acquired using such a client-host copying technique.

A further refinement is to limit the amount of data transmitted to save on system and communication bandwidth. The transmission of large amounts of data may be inefficient and take too much time. It should thus be possible to decide at either the client device or the host computer to only transmit the address of the desired information if the information is available elsewhere. This is particularly useful for information that is available on the World Wide Web. It is then enough to transmit only the URI (Universal Resource Identifier), which is the means of locating the information on the World Wide Web using a browser. The user could thus activate the copy function on the client, which would receive the URI from the host and store it. At a later stage, the user could transfer the URI using any of the means discussed above to a second computer and then use a browser to access the information stored at the location on the World Wide Web identified by the acquired URI. Of course, if only part of the text or information in the referenced address is marked, it might be desirable that some additional information also be transmitted together with the address to indicate what part is required to be copied.

The host may also offer the possibility of copying the entire data content of a selected area or just a summary text or data that is particularly designed and written for this client-host copying function.

When communication is interrupted by another user action or, for example, by interference to the IrDa transmission by incidental light or sunshine, the user should be given the possibility of restarting or resuming transmission.

In any case, it should be seen that the host needs no access to a keyboard, a conventional mouse, or any other input peripherals except the wireless communication port for the client computer to copy or paste the information. This means that, using the invention, interesting pieces of text or graphics from screens, for example, behind a shop window or at an exhibition can be copied. In a further variation, a digital television with a suitably programmed settop box can be used as the host device. In principle, then, the client device remembers anything that a user likes to remember and possibly transfer to their own computer.

What is claimed is:

1. A communications system comprising:
   a client apparatus including a storage device, a pointer, a control program in communication with a first wireless apparatus adapter to transmit pointer movement and selection signals, and first means responsive to said selection signals for communicating a first information content from said client apparatus to a host apparatus; and
   said host apparatus including a display, a control program in communication with a second wireless apparatus adapted to receive said pointer movement and selection signals from said client apparatus, means responsive to said signals for locating and selecting one or more positions on said display, and second means responsive to said selection signal for communicating a second information content from said host apparatus to said client apparatus for storage in said storage device, wherein the communications system is further characterized in that said pointer movement and selection signals are generated responsive to one of keyboard keystrokes and actions carried out on a touchscreen.

2. A communications system as claimed in claim 1, further characterized in that said selection signals comprise area selection signals to select an area of content on said display, whereby said area of content is selected for communication from said host to said client.

3. A communications system as claimed in claim 2, further characterised in that said area of content comprises one or more objects.

4. A communications system as claimed in claim 1, further characterised in that said pointer movement and selection signals are generated responsive to movements of a pointer device.

5. A communications system as claimed in claim 1, further characterised in that said wireless apparatus comprises IrDA apparatus.

6. A communications system as claimed in claim 1, further comprising, subsequent to said storage on said client apparatus, means for sending at least said first or said second information content from said client apparatus to said host apparatus.

7. Host apparatus comprising:

a display;

a control program in communication with a wireless apparatus adapted to receive pointer movement and selection signals from a client apparatus, wherein the client apparatus is further characterized in that said pointer movement and selection signals are generated responsive to one of keyboard keystrokes and actions carried out on a touchscreen;

means responsive to said signals for locating and selecting one or more positions on said display; and means responsive to said selection signal for communicating information content from said host apparatus to said client apparatus for storage in a storage device at said client apparatus.

8. Apparatus as claimed in claim 7, further characterised in that said wireless apparatus is IrDA apparatus.

9. A method for communicating information content using wireless apparatus in communications system, the method comprising the steps of:

transmitting, by a client, pointer movement and selection signals, wherein the client is further characterized in that said pointer movement and selection signals are generated responsive to one of keyboard keystrokes and actions carried out on a touchscreen;

receiving by a host said pointer movement and selection signals;

responsive to said pointer movement signals and selection signals, locating and selecting one or more positions on a display at said host; and responsive to said selection signal, communicating information content from said host to said client for storage in a storage device at said client.

10. A method for communicating information content using wireless apparatus in a communications system as claimed in claim 9, further comprising the step of, subsequent to said storage on said client, sending said information content from said client apparatus to said host apparatus.

11. A computer program product comprising program code stored on a computer-readable storage medium, the program code comprising means for, when executed on a computer system:

causing a client to transmit by wireless means pointer movement and selection signals to a host, wherein the client apparatus is further characterized in that said pointer movement and selection signals are generated responsive to one of keyboard keystrokes and actions carried out on a touchscreen; and responsive to said pointer movement signals and said selection signals, causing said client and said host to locate and communicate by wireless means information content from said host to said client for storage in a storage device at said client.

12. A computer program product comprising program code stored on a computer-readable storage medium, the program code comprising means for, when executed on a computer system:

causing a host to receive by wireless means pointer movement and selection signals from a client, wherein the client is further characterized in that said pointer movement and selection signals are generated responsive to one of keyboard keystrokes and actions carried out on a touchscreen; and responsive to said pointer movement signals and said selection signals, causing said client and said host to locate and communicate by wireless means information content from said host to said client for storage in a storage device at said client.

* * * * *